United States Patent
Graf et al.

[11] Patent Number: 6,164,713
[45] Date of Patent: Dec. 26, 2000

[54] CONVERTIBLE WITH A TOP STRUCTURE HAVING AT LEAST ONE TOP PART AND A REAR WINDOW PART

[75] Inventors: Thomas Graf, Sindelfingen; Siegfried Zipperle, Aidlingen, both of Germany

[73] Assignee: DaimlerChrysler AG, Stuttgart, Germany

[21] Appl. No.: 09/213,756

[22] Filed: Dec. 17, 1998

[30] Foreign Application Priority Data

Dec. 17, 1997 [DE] Germany ............................ 197 56 062

[51] Int. Cl.[7] .................................................... B60J 7/00
[52] U.S. Cl. ...................... 296/107.08; 296/76; 296/136
[58] Field of Search .............................. 296/146.11, 76, 296/136, 107.08, 146.12

[56] References Cited

U.S. PATENT DOCUMENTS

| | | | |
|---|---|---|---|
| 4,819,982 | 4/1989 | Eyb ..................................... | 296/107.17 |
| 5,746,470 | 5/1998 | Seel et al. ............................... | 296/108 |
| 5,775,766 | 7/1998 | Schaible et al. ..................... | 296/107.09 |
| 5,823,606 | 10/1998 | Schenk et al. ....................... | 296/107.08 |

FOREIGN PATENT DOCUMENTS

| | | |
|---|---|---|
| 0 277 295 | 8/1988 | European Pat. Off. . |
| 10 63 911 | 1/1960 | Germany . |
| 44 45 580 | 12/1995 | Germany . |
| 44 45 944 | 4/1996 | Germany . |
| 195 16 877 | 10/1996 | Germany . |

*Primary Examiner*—D. Glenn Dayoan
*Assistant Examiner*—Patricia Engle
*Attorney, Agent, or Firm*—Evenson, McKeown, Edwards & Lenahan, P.L.L.C.

[57] ABSTRACT

A convertible is provided with a top structure that has at least one top part and a rear window part. The structure is stowable in an open position in the rear area of the vehicle beneath a rear lid and at least partially in a trunk. In the top structure, the rear lid is articulated laterally in each case by a multilink articulation device with a first forward pivoting device by at least one articulation point with an articulation lever. Two auxiliary frames are mounted on the body in the rear area of the vehicle behind the first pivot device at a pivot point. At least one of the two auxiliary frames is connectable with the vehicle body by a releasable locking member and a latching device. The rear lid is connected with a vehicle body in the rear area for a top stowage function by a second rear pivoting device and a releasable latching device. The rear lid, articulation lever, and auxiliary frame together form a four-link mechanism with their articulation and pivot points.

7 Claims, 2 Drawing Sheets

CONVERTIBLE WITH A TOP STRUCTURE HAVING AT LEAST ONE TOP PART AND A REAR WINDOW PART

BACKGROUND AND SUMMARY OF THE INVENTION

This application claims the priority of German Application No. 197 56 062.8, filed Dec. 17, 1997, the disclosure of which is expressly incorporated by reference herein.

The invention relates to a convertible with a top structure having at least one top part and a rear window part, said top structure being stowable in a lowered position in the rear area of the vehicle below a rear lid at least partially in a trunk.

A hardtop vehicle is known from German Patent document DE 44 45 944 C1 (having a counterpart in U.S. 5,823,606) in which the rear lid is articulated by its pivot axis on a tubular auxiliary frame. The frame, in turn, is supported by a pivot axis on the body in the lower vehicle end area. The rear lid can be pivoted around its forward pivot axis into a lowered position that opens the trunk to the rear and can also be pivoted around a second, rear pivot axis together with the auxiliary frame into a second lowered position which opens a top storage compartment as well as the trunk upward, in which position the top structure can be lowered.

It is disadvantageous that the two laterally provided auxiliary frames are connected with one another in the rear area by a transverse part or are integral therewith, by which part the rear pivot axis is also formed. This design severely limits design considerations in the rear area of the vehicle. In addition, a not insignificant part of the trunk is required.

A solid folding top for a vehicle is known from European Patent document EP 0 277 295 B1 (having a counterpart in U.S. Pat. No. 4,819,982) in which the rear lid is movable by a four-link hinge from a closed position into an open position.

For additional prior art relating to the actuation of rear lids of motor vehicles, reference is made to German Patent documents DE 1 063 911, DE 44 45 580 C1 (having a counterpart in U.S. Pat. No. 5,746,470), and DE 195 16 877 C1 (having a counterpart in U.S. Pat. No. 5,775,766).

The goal of the present invention is to provide a convertible which allows movement of the rear lid with simple technical means both into an open position that opens the trunk toward the rear and also into an open position directed in the opposite direction in which a top structure can be stowed in the rear area of the vehicle, with the loss of trunk space simultaneously being reduced as well and with the advantages of a conventional tubular auxiliary frame being retained.

According to the invention, this goal is achieved by a convertible with a top structure that has at least one top part and a rear window part, the structure being stowable in an open position in the rear area of the vehicle below a rear lid at least partially in a trunk. The rear lid, for opening the trunk at the rear, is articulated on each side by a multilink device with a first, forward pivoting device through the use of at least one articulation point with an articulation lever in each case on a lateral auxiliary frame. The auxiliary frames are mounted to the body in the rear area of the vehicle behind the first forward pivoting device at a pivot in each case. At least one of the two auxiliary frames can be connected by a releasable locking member and a latching device with the vehicle body. The rear lid is connected in the rear area for a top stowing function by a second rear pivoting device and a releasable locking device with the vehicle body, wherein the rear lid, articulation lever, and auxiliary frame form a four-link mechanism together with their articulation and pivot points.

By the combination according to the invention, uncoupled auxiliary frames are provided in such fashion that the rear pivoting device for the rear lid and the pivots for the two lateral auxiliary frames are uncoupled, or that the auxiliary frames have their own pivots.

To open the rear lid with an opening that opens the trunk toward the rear, for example for loading the trunk, the articulated device is connected by a latching device with the body and the latching device for the rear lid is opened in the rear area.

With a reversed opening of the rear lid to stow the top structure, the articulated device, which advantageously is a multilink device and thus constitutes the front pivoting device, is separated from the body by opening the latching device. By means of an actuating device, for example a hydraulic device, the auxiliary frame is then erected. In this manner, the auxiliary frame raises the rear lid into the position in which the top structure can be stowed.

In contrast to known structures that use a tubular auxiliary frame with a transverse part in the rear area, the loss of trunk space is greatly reduced in this fashion. In addition, no influence on vehicle design results.

In contrast to known structures which have no auxiliary frame, the present invention retains a corresponding rigidity of the rear lid for a top structure during the stowing function. In addition, complete separation of the body and the rear lid hinge by a multilink hinge, for example, is not required. By retaining the auxiliary frame, by comparison with frameless versions in which scissors kinematics or telescoping cylinders must be used for larger opening angles, simple hydraulic cylinders are used to move the rear lid.

It is also advantageous that manual rear lid remote unlocking can be provided in simple fashion with weight relief by gas springs.

Other objects, advantages and novel features of the present invention will become apparent from the following detailed description of the invention when considered in conjunction with the accompanying drawings.

DETAILED DESCRIPTION OF THE DRAWINGS

Since the type of top structure, which generally comprises at least one top part and a rear window part, and the stowing kinematics of the top structure are not important to the invention, the top structure and its stowing kinematics are not shown in the two embodiments.

Figure 1:
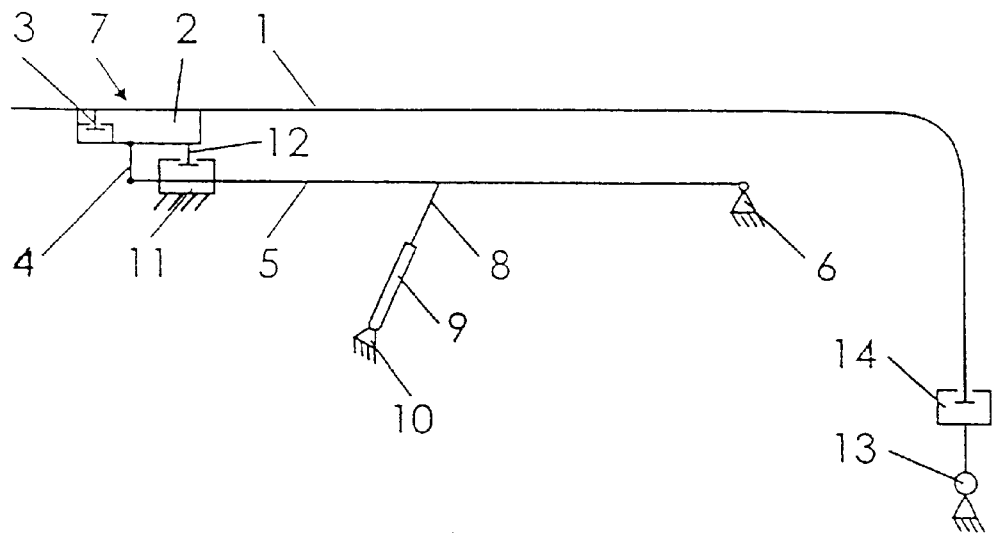
FIG. 1 shows a first embodiment according to the invention of the kinematics for moving a rear lid with the rear lid closed.
Figure 2:
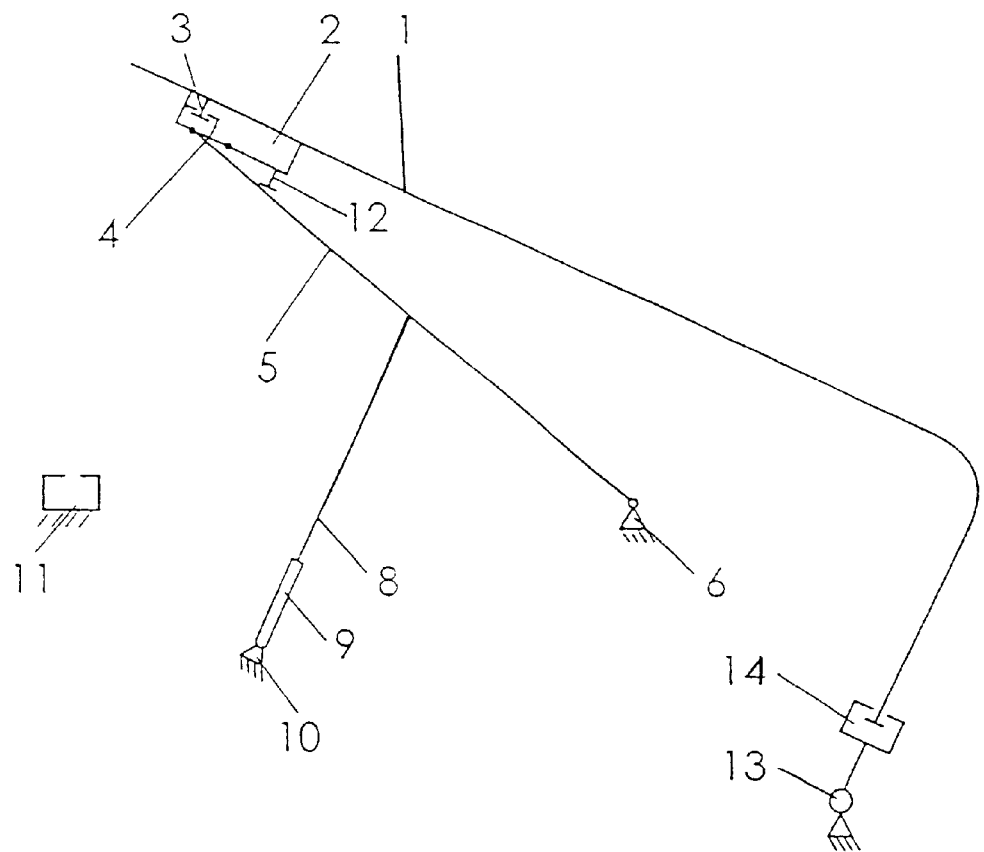
FIG. 2 shows the kinematics of the rear lid according to FIG. 1 in an open position for stowing a top structure.

A rear lid 1 according to the embodiment shown in FIGS. 1 and 2 is provided at one end, which is forward in the direction of travel, with an articulation device in the form of a multilink 2. Since the multilink 2 can be of a known design, it will not be discussed in greater detail below. The purpose of the multilink device 2 is to simultaneous allow pivoting of the rear lid 1 and vertical movement of the rear lid 1. Multilink 2 is provided with a locking part 3 that serves to secure or position the rear lid 1, so that multilink 2, when locked by locking part 3, cannot function but rather forms a solid unit with the rear lid 1.

An articulation lever is provided at lateral end areas of the multilink. One end of the articulation lever 4 is pivotably articulated on the underside of the multilink 2 in each case, and the other end of the articulation lever 4 in each case is connected via an articulation with a forward end of an auxiliary frame 5 that is likewise located laterally in the vehicle. The auxiliary frame 5 located on each side of the vehicle has its rear end mounted in the rear area of the vehicle at a lateral area in a pivot 6 on the body. Multilink 2 produces a first forward pivoting device 7 for the rear lid 1. When multilink 2 is actuated, a movement path results by which, in known fashion, the rear lid 1 is pivoted into a "normal" open position such that the trunk opens at the rear for loading. Since this function is known, it has not been shown in the drawing.

In the middle area, a piston rod 8 of an actuating cylinder 9 engages at least one auxiliary frame 5 (at least on one lateral side of the vehicle). Actuating cylinder 9 is mounted with articulation in a supporting point 10 on the body. Auxiliary frame 5 is also provided with a latching device 11 integral with the body which cooperates with a locking member 12 connected with multilink 2.

In the rear area, the rear lid 1 is pivotably connected with a vehicle body for a top-stowing function by means of a second rear pivoting device 13 and a locking device 14.

As can be seen in FIG. 2, the rear lid 1 assumes a position to receive a top structure beneath the rear lid 1. In order to achieve this position, actuating cylinder 9 is actuated so that piston rod 8 is extended and the two lateral auxiliary frames 5 are each pivoted upward around pivot 6. For this it is necessary for latching device 11 to be released or for locking member 12 to be released from the latching device 11 accordingly. During this pivoting movement, the multilink device 2 is held by the locking part 3. The pivoting movement of the two lateral auxiliary frames 5 is also provided by the two lateral articulation levers 4 and the locked multilink 2 on rear lid 1. In the rear area, the rear lid 1 remains held in locking device 14 and pivots around pivoting device 13.

If the rear lid 1 is to be pivoted into a position in which the trunk opens toward the rear, the two auxiliary frames 5 remain locked by the latching device 11. Locking device 14 is released and the rear lid 1 is pivoted by the multilink 2. In this manner, an opening is produced at the rear for loading the trunk.

As can be seen from FIGS. 1 and 2, the rear lid 1, articulation lever 4, and auxiliary frame 5, together with their articulation points and pivots, form a four-link mechanism.

Figure 3:
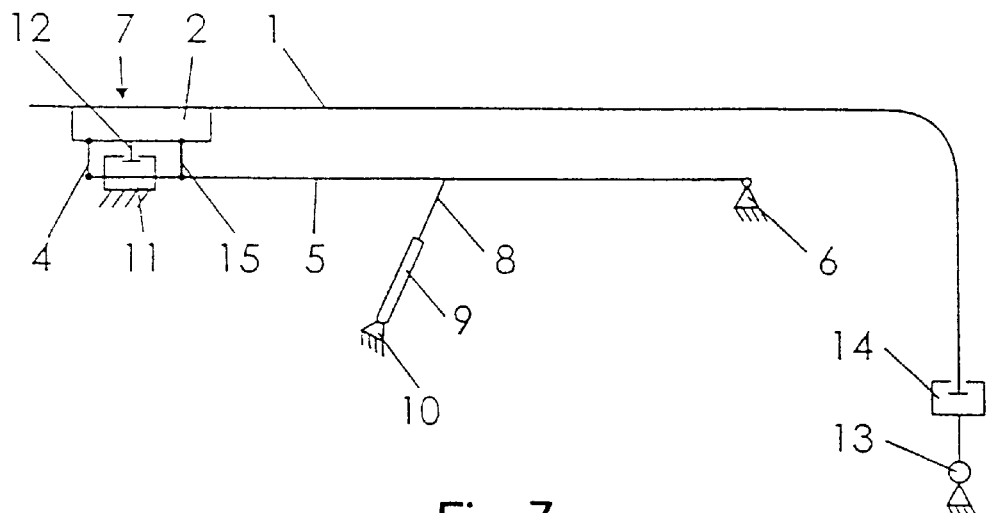
FIG. 3 is a second embodiment according to the invention of the kinematics for moving a rear lid with the rear lid closed.
Figure 4:
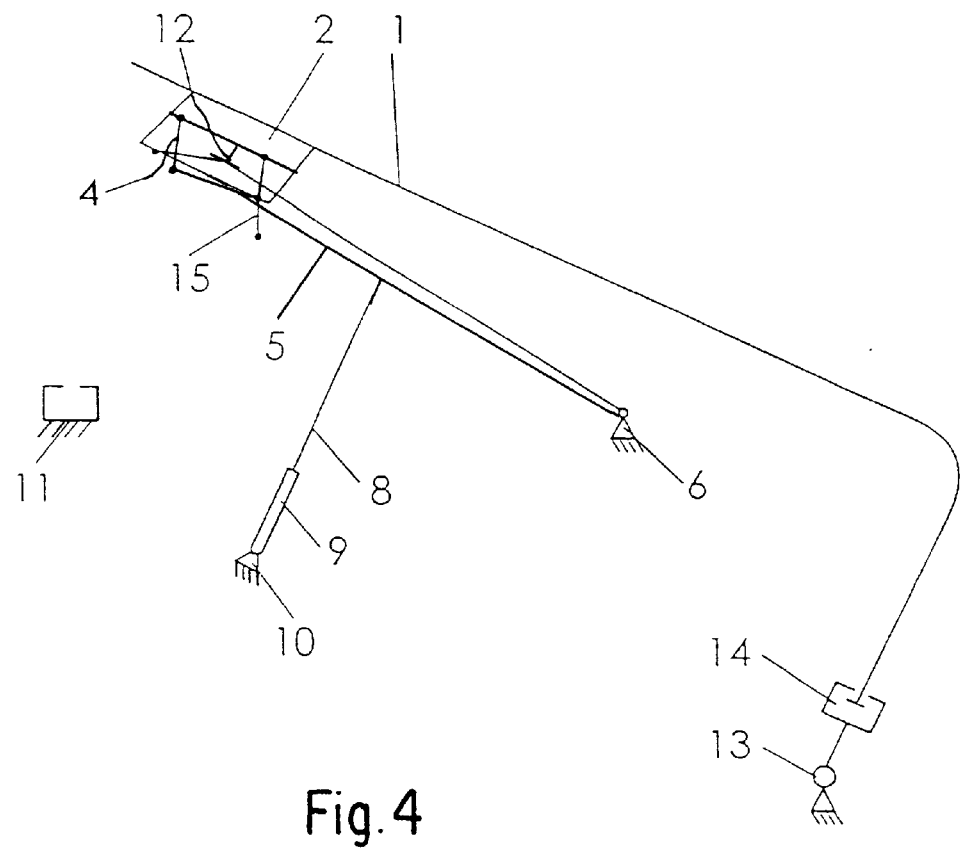
FIG. 4 shows the kinematics of the rear lid according to FIG. 3 in an open position for stowing a top structure.

Another embodiment of the kinematics according to the invention is shown in principle in FIGS. 3 and 4. Basically, this embodiment functions in the same way as the embodiment shown in FIGS. 1 and 2, for which reason the same reference numbers have been retained for the same parts. The important difference between this embodiment and the embodiment shown in FIGS. 1 and 2 is that parallel to articulation levers 4 on each side, there is an intermediate lever 15 likewise connected with multilink 2 which, in each case, forms a parallel crank drive with the corresponding articulation lever 4.

In the embodiment shown in FIGS. 1 and 2, the multilink 2 must be locked by the locking part 3 during actuation of rear lid 1 in the direction shown in FIG. 2.

With the intermediate lever 15 according to FIGS. 3 and 4 and the resultant crank drive, the locking part 3 for the multilink 2 can be eliminated. In this case, a specific movement is possible for multilink 2.

FIG. 3 shows the closed rear lid in the same way as FIG. 1, while FIG. 4 shows the position of rear lid 1 in the position in which the top structure can be stowed.

In the same way as in the embodiment shown in FIGS. 1 and 2, for opening rear lid 1 for loading from the rear of the vehicle, the lid is released from locking device 14 and the rear lid 1 is pivoted forward and upward by the multilink 2 while the latching member 12 is simultaneously secured in the locking member 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A convertible vehicle, comprising:
    a top structure having at least one top part and a rear window part;
    a rear lid of a trunk of the vehicle, the top structure being stowable in a rear area of the vehicle below the rear lid at least partially in the trunk;
    auxiliary frames respectively mounted one on each lateral side of the vehicle with a respective pivot in a rear portion of the rear area;
    an articulation device for articulating the rear lid in order to open the trunk at a rear end with a first, forward pivoting device through at least one articulation point, with an articulation lever arranged on a respective lateral one of the auxiliary frames;
    a releasable locking member and a latching device operatively connecting with at least one of the two auxiliary frames;
    a second rear pivoting device and a second releasable locking member coupling the vehicle with a rear area of the rear lid to provide a top stowing function;
    wherein the rear lid, the articulation lever, and the auxiliary frames form a four-link mechanism together with the respective articulation and pivot points.

2. The convertible vehicle according to claim 1, wherein the articulation device is formed with the first, forward pivoting device as a multilink which is lockable to the rear lid via a locking part.

3. The convertible vehicle according to claim 1, wherein on the auxiliary frames parallel to the articulation levers, on each side an intermediate lever is provided likewise connected with the articulation device, said intermediate lever, together with the corresponding articulation lever, each forming a parallel crank drive.

4. The convertible vehicle according to claim 1, wherein at least one of the auxiliary frames is actuated by an actuating cylinder.

5. The convertible vehicle according to claim 2, wherein at least one of the auxiliary frames is actuated by an actuating cylinder.

6. The convertible vehicle according to claim 3, wherein at least one of the auxiliary frames is actuated by an actuating cylinder.

7. A lid structure for a rear area of a vehicle having a body, comprising:

a rear lid covering the rear area and pivotably opening the rear area at each longitudinal end thereof;

first and second auxiliary frames mountable to the body in a rear portion of the rear area with one on each lateral side of the rear area;

first and second articulation levers respectively coupled to the first and second auxiliary frames via respective articulation points;

an articulation device having a forward pivot device coupling the rear lid with the respective articulation levers;

a first releasable locking member and a first latching member operatively connected with at least one of the first and second auxiliary frames;

a rear pivoting device and a second releasable locking member operatively connected with a rear portion of the rear lid;

wherein the rear lid, the articulation levers and the auxiliary frame form a four-link mechanism together with the respective articulation and pivot points.

* * * * *